April 18, 1939.  S. COOPER  2,155,006
ANIMAL TRAP
Filed April 4, 1938  2 Sheets-Sheet 1
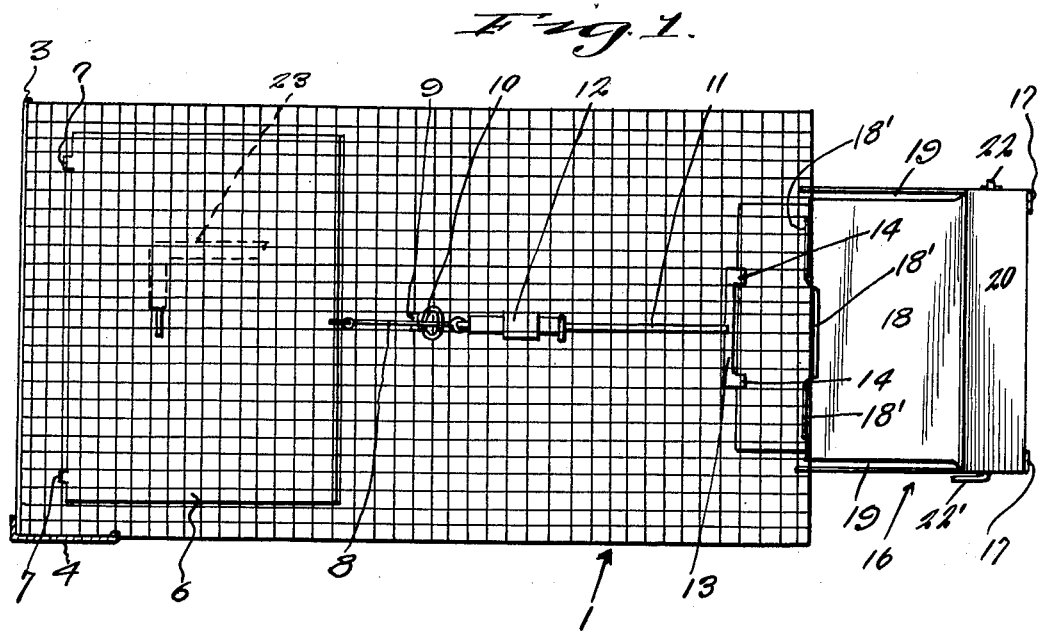
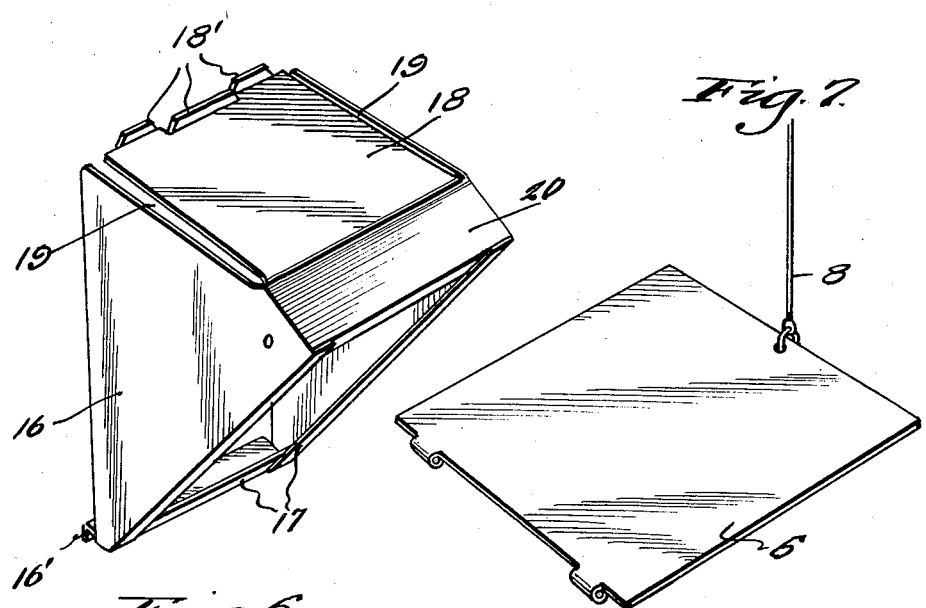
Inventor
Sutton Cooper
By L. B. James
Attorney April 18, 1939. S. COOPER 2,155,006
ANIMAL TRAP
Filed April 4, 1938 2 Sheets-Sheet 2

Inventor
Sutton Cooper
By L. B. James
Attorney

Patented Apr. 18, 1939

2,155,006

UNITED STATES PATENT OFFICE 2,155,006

ANIMAL TRAP

Sutton Cooper, Evansville, Ind., assignor of one-half to Edward A. Lorch, Evansville, Ind.

Application April 4, 1938, Serial No. 199,965

4 Claims. (Cl. 43—61)

This invention relates to a trap, the general object of the invention being to provide a gravity closed door, a trigger for holding the door open, a platform adapted to be lowered by an animal attempting to reach the bait, and a weighted rod connected to the trigger and to a cable which is connected to the platform and passes over a raised pulley, the parts being so constructed and arranged that the weighted rod will hold the platform in raised position and the lowering of the patform will cause the rod to release the trigger, so that the door can drop to closed position and thus trap the animal.

Another object of the invention is to provide a member having a door opening therein, closed by the door, with means whereby the member can be easily removed from position covering an opening in one end of the trap and put back in place.

The invention also consists in certain other features of construction, combination and arrangement of the several parts, to be hereinafter fully described, illustrated in the accompanying drawings and specifically pointed out in the appended claims.

In describing the invention in detail reference will be had to the accompanying drawings wherein like characters denote like or corresponding parts throughout the several views and in which:

Fig. 1 is a top plan view of the trap.

Fig. 6 is a perspective view of the front member which carries the gravity door.

Fig. 7 is a view of the platform.

Figure 2:
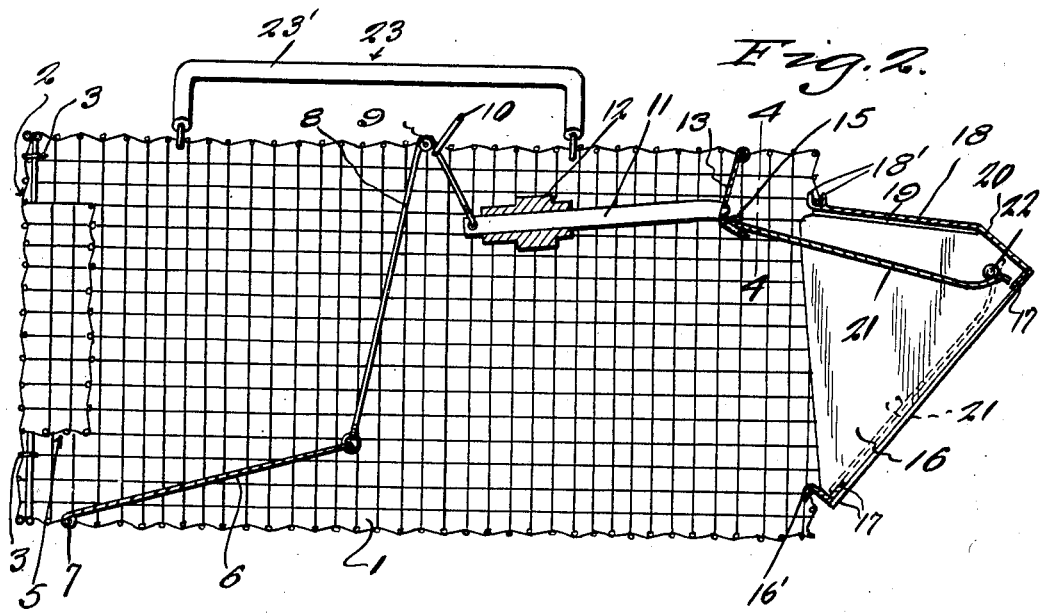
Fig. 2 is a longitudinal sectional view thereof.
Figure 3:
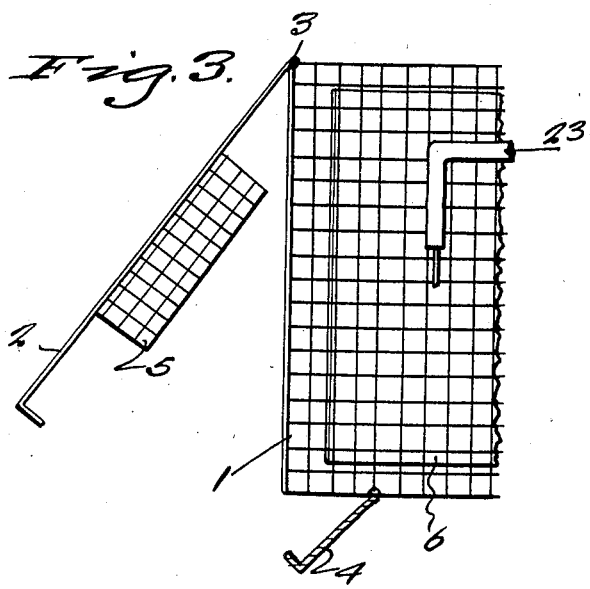
Fig. 3 is a top plan view of the rear part of the trap showing the rear door open.

In these drawings, the numeral 1 indicates the body of the trap, which is preferably made in the form of a wire casing, with its rear end opened and adapted to be closed by a door 2, hinged at one side edge, as shown at 3, and 4 indicates a latch for holding the door closed. A bait holder 5, formed of wire, is carried by the inner face of the door. A platform forming plate 6 is hinged at its rear edge to the bottom of the trap, as at 7 and a cable 8 is connected to the front edge of the plate. The cable passes over a pulley 9 at the top of the trap at approximately the center of the top and then through a ring 10. Said ring is of such a size that it cannot pass entirely through the opening formed by the wire mesh, through which a part of the ring passes, so that the ring is always accessible at the top of the trap for pulling the cable upwardly. The cable is connected to the rear end of a rod 11 having a weight 12 adjustably held thereon by friction.

Figure 4:
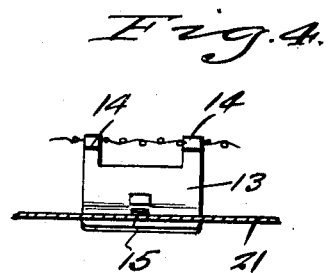
Fig. 4 is a section on line 4—4 of Fig. 2.
Figure 5:
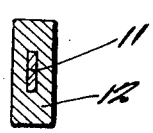
Fig. 5 is a sectional view through the weight and the rod.

A trigger plate 13 is swingingly supported from the top of the trap, adjacent its front end, by having a pair of limbs, formed at the top of the plate, bent over a wire of the top, as shown at 14 in Fig. 4. The front end of the rod 11 is pivoted to this plate, and said plate has its lower end bent forwardly at an angle and this part is cut and bent to provide the lip 15, which extends upwardly and forwardly from said part as shown in Fig. 2.

An opening is formed in the front end of the body of the trap and is closed by a substantially triangular shape housing 16, the straight side of which is open and extends into said front opening. The front of the housing extends upwardly and outwardly and has a door opening therein, which leaves surrounding flanges 17, see Fig. 6. The top 18 has the major portion thereof separated from the sides by the slots 19, so that this part of the top is slightly resilient and can be bent downwardly for a purpose to be described. The front part of the top slopes downward to the top flange 17, as shown at 20. A gravity closed door 21 has its upper edge supported on the hinge pin 22, having a handle part 22' at one end thereof and the pin passes through the upper front part of the housing, under the part 20, the door normally resting upon the inner faces of the flanges 17, to close the front opening of the housing, under the action of gravity.

The top 18 is formed with the three upstanding ears 18', the inner one of which is offset from the outer ones and these ears will hook over a wire of the front end of the trap, as shown in Fig. 2 and the bottom of the housing is formed with a rear hook 16' for hooking over a wire at the bottom of the front opening. Thus the housing is held in place by the ears and hook 16' and by pressing downwardly the part 18, the ears 18' can be released from the top wire and then the housing can be moved upwardly and outwardly to move the hook 16' from the bottom wire, so as to remove the housing from the front end of the body. In replacing the housing the bottom hook is placed on the lower wire and then the housing moved towards the body and the top 18 depressed to engage the ears with the top wire.

When raised the lower end of the door 21 will rest on the sloping part of the trigger plate, with a part extending under the lip 15, as shown in Fig. 2, and the parts are so arranged that they will hold the door in raised position and the platform 6 partly raised, as shown in Fig. 2.

Thus an animal can enter the front door and as it walks to the rear of the trap to reach the bait in the holder 5, it will step on the platform 6. The weight of the animal will cause the platform to swing downwardly, exerting a pull upon the cable 8, which swings the rod 11 upwardly and rearwardly and this movement of the rod pulls the trigger plate away from the door 21, so that the door will drop to closed position and thus the animal will be trapped.

The animal can be removed by opening the door 2 and by removing the housing access can be had to the front of the trap and the parts therein. This housing can be removed when it is desired to adjust the weight on the rod; for instance, to reset the trap it is simply necessary to lift the door 21 and pull upon the ring 10, which will raise the platform and the weighted rod and thus cause the trigger plate to engage the raised door 21.

A handle 23 is connected to the top of the trap and by forming the body of wire mesh the different parts which are connected to the body can be easily connected therewith by engaging some of the wires. The handle can be formed of a U shaped wire having its ends bent over some of the top wires and a covering 23' may be placed over this wire part of the handle, as shown.

It is thought from the foregoing description that the advantages and novel features of the invention will be readily apparent.

It is to be understood that changes may be made in the construction, combination and arrangement of the several parts provided such changes fall within the scope of the appended claims.

What I claim and desire to protect by Letters Patent is:

1. A trap of the class described, comprising a casing body formed of wire mesh and having its rear end open and having an opening in its front, a door closing the rear opening, a bait holder connected with the door, a housing projecting from the front of the trap and having an upwardly and outwardly extending front provided with a door opening, a door hinged at its upper end to the front top portion of the housing and closing the door opening by gravity, a trigger plate hinged to the top of the body and having a forwardly sloping lower end for supporting the free end of the gravity door when the same is raised, a weighted rod connected to the trigger plate and extending rearwardly, a cable connected with the rear end of the rod, an upper pulley over which the cable passes, and a hinged platform in the rear of the body to which the cable is connected, the rod normally holding the platform in raised position with the trigger plate holding the gravity door raised, and said rod being adapted to move the trigger plate to releasing position when pulled upon by the cable being pulled by the lowering of the platform, under the weight of an animal.

2. A trap of the class described, comprising a body, a platform hinged to the bottom thereof, a cable connected with the platform, a pulley at the top of the body and over which the cable passes, a rod having its rear end connected with the cable, an adjustable weight on the rod, a trigger plate hinged to the top of the body and a gravity closed door for closing the front of the body and held in open position by the trigger plate, the trigger plate being moved to releasing position by the rod when the cable is pulled upon by an animal stepping on the platform.

3. A trap of the class described, comprising a body, a platform hinged to the bottom thereof, a cable connected with the platform, a pulley at the top of the body and over which the cable passes, a rod having its rear end connected with the cable, an adjustable weight on the rod, a trigger plate hinged to the top of the body, a gravity closed door for closing the front of the body and held in open position by the trigger plate, the trigger plate being moved to releasing position by the rod when the cable is pulled upon by an animal stepping on the platform, and a ring connected with the cable in front of the pulley and extending through the top of the body, for resetting the parts.

4. In a trap of the class described, a body having an opening at its front end, a housing of substantially triangular shape and having its straight side open and extending upwardly and outwardly and having a door opening therein, the top of the housing being of spring construction and having hooks at its inner end for engaging the top wall of the first opening, a hook at the bottom of the housing for engaging the lower wall of said first opening for detachably holding the housing in place, a door hinged at its upper and to the front top part of the housing and closing the door opening by gravity, trigger means for holding the door open and means for releasing the trigger means by an animal in the trap.

SUTTON COOPER.